United States Patent [19]

Dunville et al.

[11] 4,346,799

[45] Aug. 31, 1982

[54] CONVEYOR SYSTEM WITH PART TRANSFER DEVICE

[75] Inventors: Dennis L. Dunville, Mishawaka, Ind.; William W. Seaton, Dexter; Charles H. Good, Ann Arbor, both of Mich.

[73] Assignee: Dearborn Fabricating & Engineering Corp., Mishawaka, Ind.

[21] Appl. No.: 156,058

[22] Filed: Jun. 3, 1980

[51] Int. Cl.³ .............................................. B65G 47/34
[52] U.S. Cl. .................................. 198/367; 198/457; 198/796
[58] Field of Search .................. 198/365, 456–457, 198/477, 482–483, 680, 796, 367; 104/127, 135; 414/564, 392

[56] References Cited

U.S. PATENT DOCUMENTS 2,849,101  8/1938  Austin et al. ...................... 198/477

3,921,789 11/1975 Goldinger et al. ................ 198/365

FOREIGN PATENT DOCUMENTS 580148 11/1977 U.S.S.R. ............................ 198/477

Primary Examiner—John J. Love
Assistant Examiner—Douglas D. Watts
Attorney, Agent, or Firm—Oltsch, Knoblock & Hall

[57] ABSTRACT

A conveyor system having an intermediate roller conveyor section which is shiftable as a unit between an upper operative position and a lower inoperative position. An overhead conveyor extends transversely relative to the intermediate roller conveyor section and includes a plurality of carriers positionable over the intermediate roller conveyor section for receiving a part when the conveyor section is in its lowered or inoperative position.

6 Claims, 5 Drawing Figures

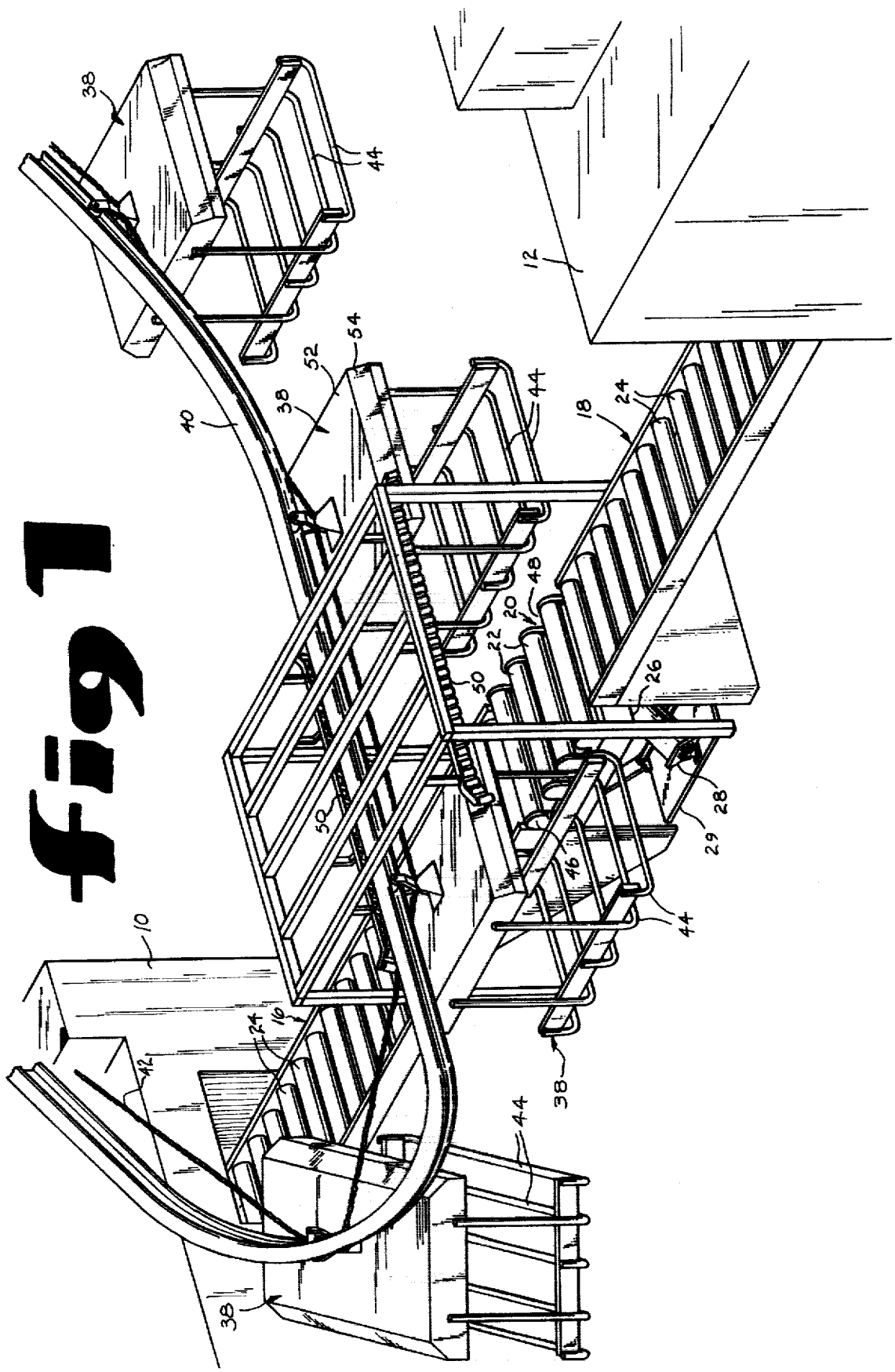

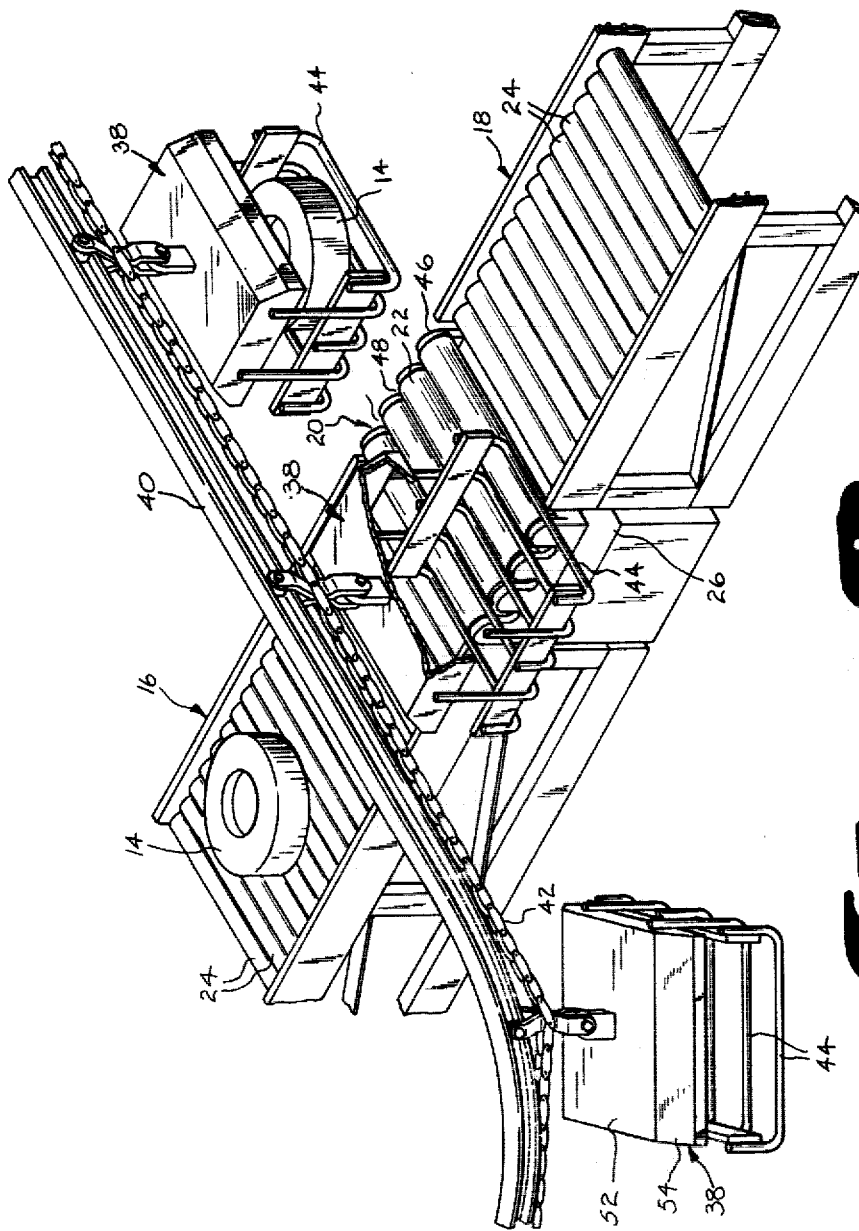

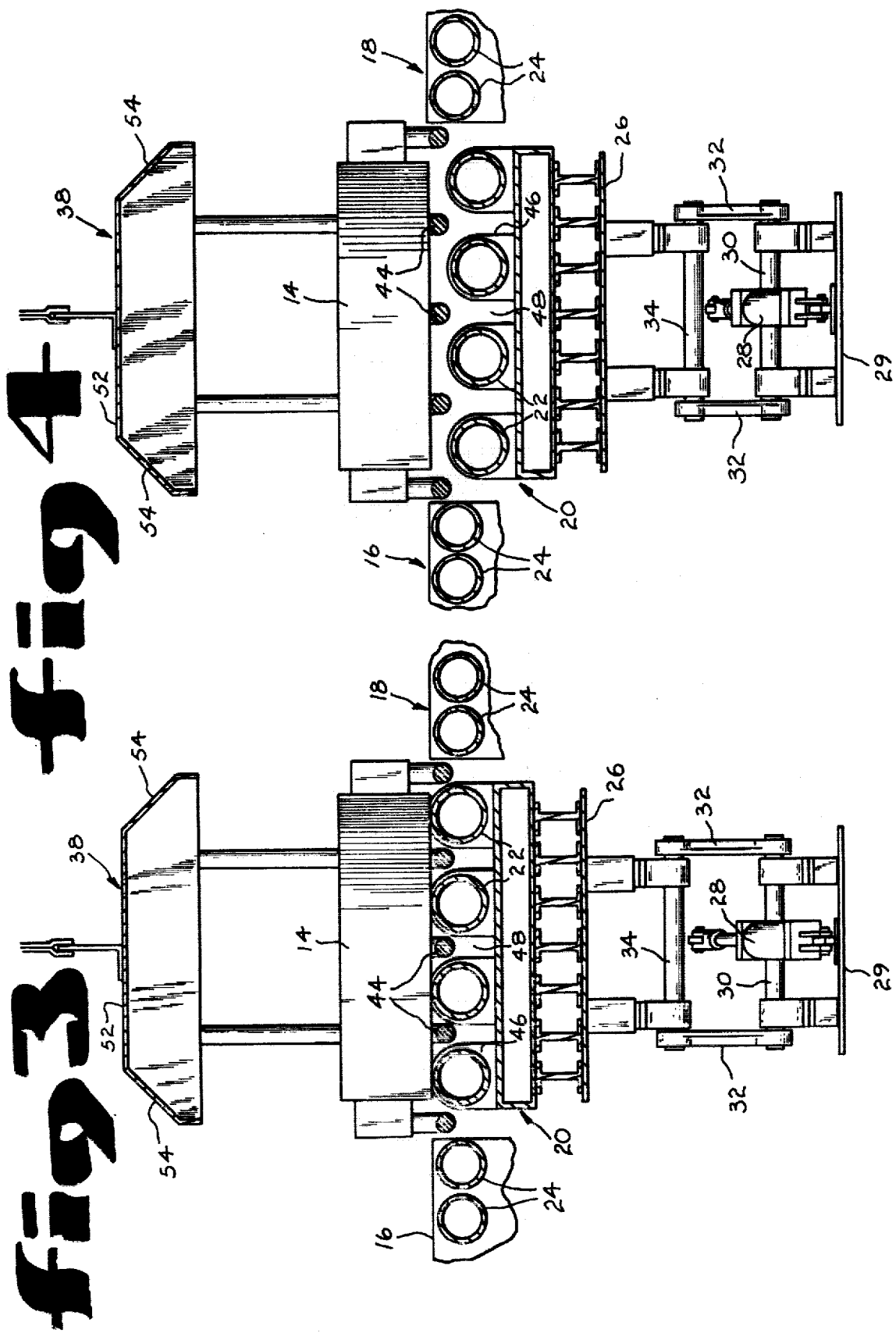

4,346,799

CONVEYOR SYSTEM WITH PART TRANSFER DEVICE

SUMMARY OF THE INVENTION

This invention relates to a conveyor system and will have specific application to a transfer device by which parts may be removed from or placed upon the main conveyor line of the system when desired.

The conveyor line of the above mentioned system includes first and second conveyor sections separated by an intermediate section. The intermediate conveyor section is shiftable relative to the first and second conveyor sections between an upper or operative position in which a part may pass along the conveyor line and over the intermediate section and a lower or inoperative position. An overhead conveyor which includes a plurality of carriers extends over the intermediate conveyor section. Each carrier is of a tunnel shape or open center construction and is positionable upon the intermediate conveyor section. When the intermediate conveyor section is in its upper or operative position, the parts pass through the overlying carrier along the conveyor line. When it is desired to transfer a part, the intermediate conveyor section is lowered which exposes the bottom of the carrier so that the carrier now supports the part and can move or transport the part from the conveyor line. Likewise, parts carried by the carriers can be transported and deposited upon the intermediate conveyor section when desired.

By utilizing an overhead conveyor with carriers in association with the conveyor line, a transfer device which does not use floor space for storing the transported parts can be provided. Downtime along the conveyor line can be minimized. Such a conveyor system requires a minimum of maintenance and is of a relative low cost.

Accordingly, it is an object of this invention to provide a conveyor system which includes carriers by which parts may be removed from or placed upon the conveyor line in a rapid manner.

Another object of this invention is to provide a conveyor system which includes a part transfer device for removing parts from a main conveyor line and which does not utilize floor space in which to store the removed parts.

Still another object of this invention is to provide a conveyor system with part transfer device which is of low cost and which requires minimum maintenance.

Still another object of this invention is to provide a means of minimizing downtime along a conveyor line.

Other objects of this invention will become apparent upon a reading of the invention's description.

BRIEF DESCRIPTION OF THE DRAWINGS

A preferred embodiment of this invention has been chosen for purposes of illustration and description wherein:

FIG. 1 is a fragmentary perspective view of the conveyor system and the part transfer device thereof.

FIG. 2 is a fragmentary perspective view of the conveyor system with a carrier being positioned over an intermediate conveyor section.

FIG. 3 is a fragmentary sectional view taken along line 3—3 of FIG. 5 showing a carrier positioned upon the intermediate conveyor section with the conveyor section in its upper operative position.

FIG. 4 is a fragmentary sectional view of the carrier like FIG. 3 but with the intermediate conveyor section shown in its lower inoperative position.

DESCRIPTION OF THE PREFERRED EMBODIMENT

Figure 5:
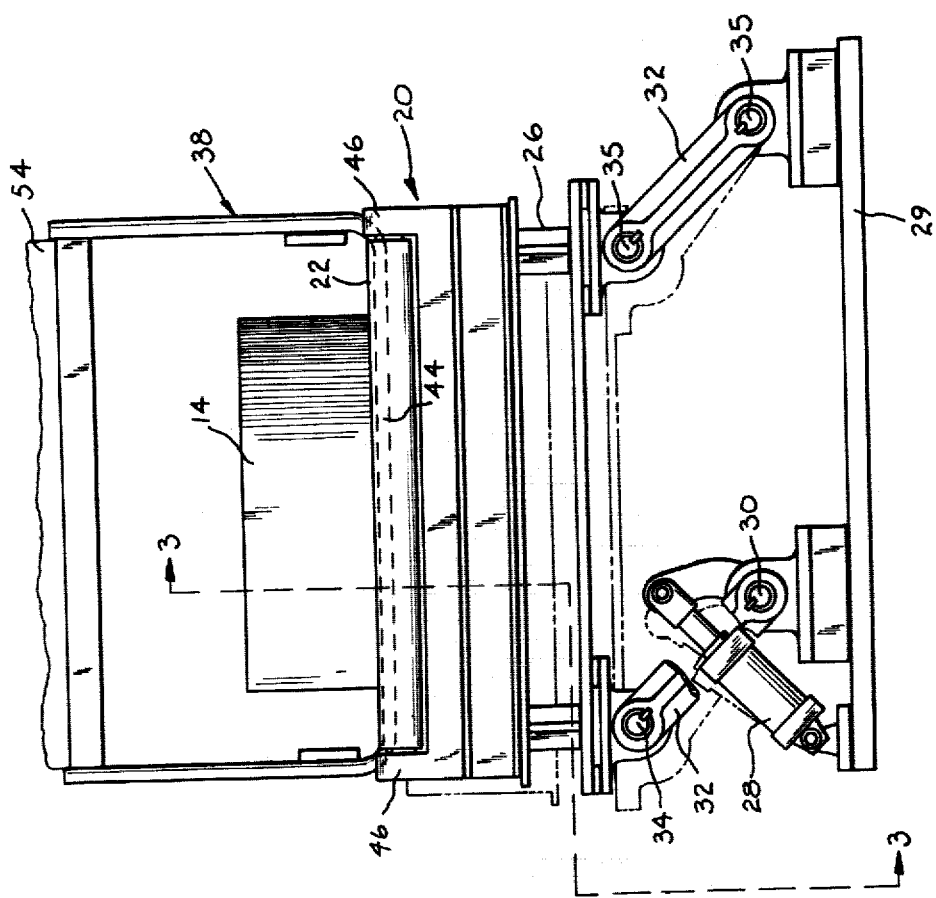
FIG. 5 is an end view of the intermediate conveyor section illustrating the means by which the intermediate conveyor section is raised and lowered between its operative and inoperative positions.

The preferred embodiment illustrated is not intended to be exhaustive or to limit the invention to the precise form disclosed. It is chosen and described in order to explain the principles of the invention and its application and practical use to thereby enable others skilled in the art to best utilize the invention.

The conveyor system includes a conveyor line extending between a work station 10 and another work station 12. Work stations 10 and 12 may provide any of a variety of manufacturing operations with parts 14 being conveyed by the conveyor line from one station to the other. The conveyor line includes a conveyor section 16 and a conveyor section 18. Conveyor sections 16 and 18 are separated between work stations 10 and 12 to accommodate an aligned intermediate conveyor section 20. Intermediate conveyor section 20 is of the roller type, having power driven rollers 22. Conveyor sections 16 and 18 also preferably include power driven rollers 24, although a power driven belt or similar type of work part supporting conveyance could be utilized. In each of the conveyor sections 16, 18, 20, the rollers 22, 24 are driven independently of the rollers in the other conveyor sections. The manner in which the rollers 22, 24 of the conveyor sections are rotated can vary in accordance with commercially available constructions or known means.

Intermediate conveyor section 20 is mounted upon a platform 26. Platform 26 can be moved vertically with intermediate conveyor section 20 being shiftable from an upper, operative position as seen in FIGS. 3 and 5 and a lower, inoperative position as seen in FIG. 4 and in broken lines in FIG. 5. When conveyor section 20 is in its upper position, the top or part supporting surface of rollers 22 is co-planar with the tops or part supporting surfaces of rollers 24 of the conveyor sections 16 and 18. With conveyor section 20 in its lower position, the part supporting surface of rollers 22 is recessed or spaced below the plane of the part supporting surfaces of rollers 24 of conveyor sections 16 and 18. Intermediate conveyor section 20 is moved between its upper and lower positions by means of a power cylinder 28 which is connected to a base 29 and which serves to rotate a bearing supported cross shaft 30. Cross shaft 30 is in turn connected to a pair of arm links 32 which extend to and are pivotally connected to one end of platform 26 by second bearing supported cross shaft 34. A second pair of arm links 32 are connected to bearing supported shafts 35 and extend from base 29 to the other end of platform 26. It is to be understood that other controlled means, such as hydraulic lifts, can be utilized to raise and lower platform 26 and thus position intermediate conveyor section 20 in its upper and lower positions.

An overhead conveyor forms a part of the conveyor system of this invention and is associated with the conveyor line which includes previously described conveyor sections 16, 18 and 20. The overhead conveyor includes a plurality of spaced carriers 38, each supported by an overhead rail 40. The carriers are selectively moved along rail 40 by a chain 42 which is power driven by suitable means, such as a hydro-static drive. Rail 40 extends to selected locations in the plant which can accommodate carriers 38. Each carrier 38 is of a rigid sling or tunnel construction and has a bottom wall support for parts 14 formed from a plurality of laterally spaced parallel rods 44. Carriers 38 are large enough to accommodate parts 14 which move along the conveyor line upon conveyor sections 16, 18, and 20. Each carrier 38 is positionable over intermediate conveyor section 20 with rollers 22 of the conveyor section being spaced sufficiently apart to accommodate rods 44 of the carrier when the conveyor section is in its upper position as illustrated in FIG. 3. The sides 46 of conveyor section 20 which support rollers 22 are cut away or notched between rollers to allow each carrier 38 to be laterally moved into position over the conveyor section as illustrated in FIG. 2 with the conveyor section even in its upper position and the carrier empty. Such notches 48 in sides 46 of conveyor section 20 accommodate rods 44 of each carrier 38 as it is moved by chain 42 into position over the conveyor section.

When conveyor section 20 is in its upper position and a carrier 38 is supported thereover, the part supporting surface of rollers 22 extends above rods 44 of the carrier to enable a part 14 to pass along the conveyor line, over intermediate conveyor section 20 and through the positioned carrier 38 without interruption. When it is desired or perhaps becomes necessary due to a downtime situation with respect to work station 12 to remove parts 14 from the conveyor line, intermediate conveyor section 20 is shifted into its lower position, as illustrated in FIG. 4, as part 14 enters the overlying carrier 38 and is positioned above rods 44 of the carrier. Movement of conveyor section 20 from its upper into its lower position causes part 14 to come to rest upon rods 44 of the carrier 38. When this occurs the drive to chain 44 of the overhead conveyor is actuated to cause the carrier and part 14 to be shifted off the conveyor line, as illustrated in FIG. 2. When one carrier 38 leaves the conveyor line, a second carrier 38 is moved in position over conveyor section 20 with the conveyor section being shifted through actuation of power cylinder 28 into its upper position so that rollers 22 protrude above rods 44 of the newly positioned carrier. The newly positioned carrier 38 is now ready to receive the next part 14 as it proceeds along conveyor section 16. Once a part 14 enters the newly positioned carrier 38, the process of lowering conveyor section 20 is repeated and the overhead conveyor actuated to shift the carrier and its newly received part from the conveyor line.

When it is desired to redeposit parts 14 upon the conveyor line, each part carrying carrier 38 is brought into position over intermediate conveyor section 20 with the section in its lower position. The conveyor section 20 is then raised causing its rollers 22 to project above carrier rods 44 and contact and lift the part. As the rollers 22 of conveyor section 20 are rotated, part 14 now supported by the rollers is moved from the conveyor section 18 where the part is carried to the next work station. Intermediate conveyor section 20 is then lowered and another part carrying carrier 38 positioned above the conveyor section. The unloading process is then repeated. The number of carriers 38 required within the conveyor system will vary depending upon the purpose of the transfer device. If its purpose is to accommodate downtime of equipment, then a sufficient number of carriers must be provided to accommodate a selected period of such downtime. Also, overhead conveyor rail 40 can extend to a selected storage area within the plant at which the parts 14 carried upon carriers 38 can be unloaded and stored if necessary. Although not shown, the use of sensors and other actuating equipment can be incorporated into the conveyor system and its transfer device to sense part location and movement for coordinating the movement of carriers 38 and intermediate conveyor section 20.

Due to the position of the parts upon carriers 38 or the shape of the parts, a carrier while supporting the part in suspended orientation may not be vertically oriented. Normally, the carrier will be tilted to one side or the other. This is not overly critical when the carrier is lifted away from intermediate conveyor section 20. The vertical orientation of a part carrying carrier is critical when the carrier is moved over the intermediate conveyor section to deposit the part. In this case, the carrier rods 44 must be aligned with the spacing between rollers 22 of the conveyor section. Obviously, if the carrier were tilted too far out of vertical alignment, the rods may not fit between conveyor section rollers 22 and thus cause jamming of the transfer device. To vertically align a part carrying carrier 38, a pair of roller guides 50 are supported above conveyor section 20 at each of its ends. Each carrier 38 includes a top 52 which has beveled end edges or camming surfaces 54. As the carrier is brought into position over conveyor section 20, its end edges 54 contact guides 50 which serve to right or vertically align the carrier. In this manner each carrier 38 has its bottom rods 44 aligned with notches 48 in sides 46 of the conveyor section and between rollers 22 thereof as the carrier is shifted by the overhead conveyor drive over the conveyor section.

It is to be understood that the invention is not to be limited to the details above given but may be modified within the scope of the appended claims.

What we claim is:

1. A conveyor system for conveying parts comprising a first conveyor section and a second conveyor section separated therefrom by an intermediate conveyor section, each conveyor section having a part supporting a surface, said conveyor sections being aligned to convey a plurality of parts over each conveyor section supporting surface, said intermediate conveyor section being shiftable between an upper operative position in which the supporting surfaces of the conveyor sections are generally co-planar to accommodate the passing of parts thereover and a lower position in which the supporting surface of said intermediate conveyor section is located below the supporting surfaces of said first and second conveyor sections, a plurality of carriers each supported for movement over said intermediate conveyor section, each carrier including a base which is located below the supporting surface of said intermediate conveyor section when the carrier is positioned above such conveyor section and the conveyor section is in its upper position to allow said parts to be conveyed over said conveyor sections and through the carrier, means for shifting said intermediate conveyor section between its upper and lower positions, the supporting surface of said intermediate conveyor section being located below the base of each carrier when the carrier is positioned above such conveyor section and such conveyor section is in its lower position to cause the part over the intermediate conveyor section to be supported by the carrier, and means for moving said carriers over said intermediate conveyor section to remove parts from or to place parts upon such conveyor section when said parts are supported by the carriers, said carriers and means for moving the carriers over said intermediate conveyor section being components of an overhead conveyor, said intermediate conveyor section supporting surface including a plurality of spaced apart rollers extending transversely to the direction of part movement over such conveyor section, each carrier base including a plurality of spaced apart rod members, said rod members located between rollers of said intermediate conveyor section when the conveyor section is in its upper position and a carrier is positioned thereabove with the periphery of the rollers extending above the rod members.

2. The conveyor system of claim 1 wherein said intermediate conveyor section includes sides journaling said rollers, said sides being notched between rollers to accommodate lateral insertion of a carrier at its rod members between said rollers when the intermediate conveyor section is in its upper position.

3. The conveyor system of claim 1 wherein each carrier is open ended along the path of part movement over the intermediate conveyor section.

4. The conveyor system of claim 1 and including spaced guide means located above said intermediate conveyor section for contacting each carrier as it moves over such conveyor section to vertically orient the carrier.

5. The conveyor system of claim 4 wherein each carrier includes side and top sections, each carrier top section including camming surfaces for contacting said guide means during vertical orientation of the carrier.

6. The conveyor system of claim 1 wherein said intermediate conveyor section rollers are power driven.

* * * * *